Patented Aug. 18, 1953

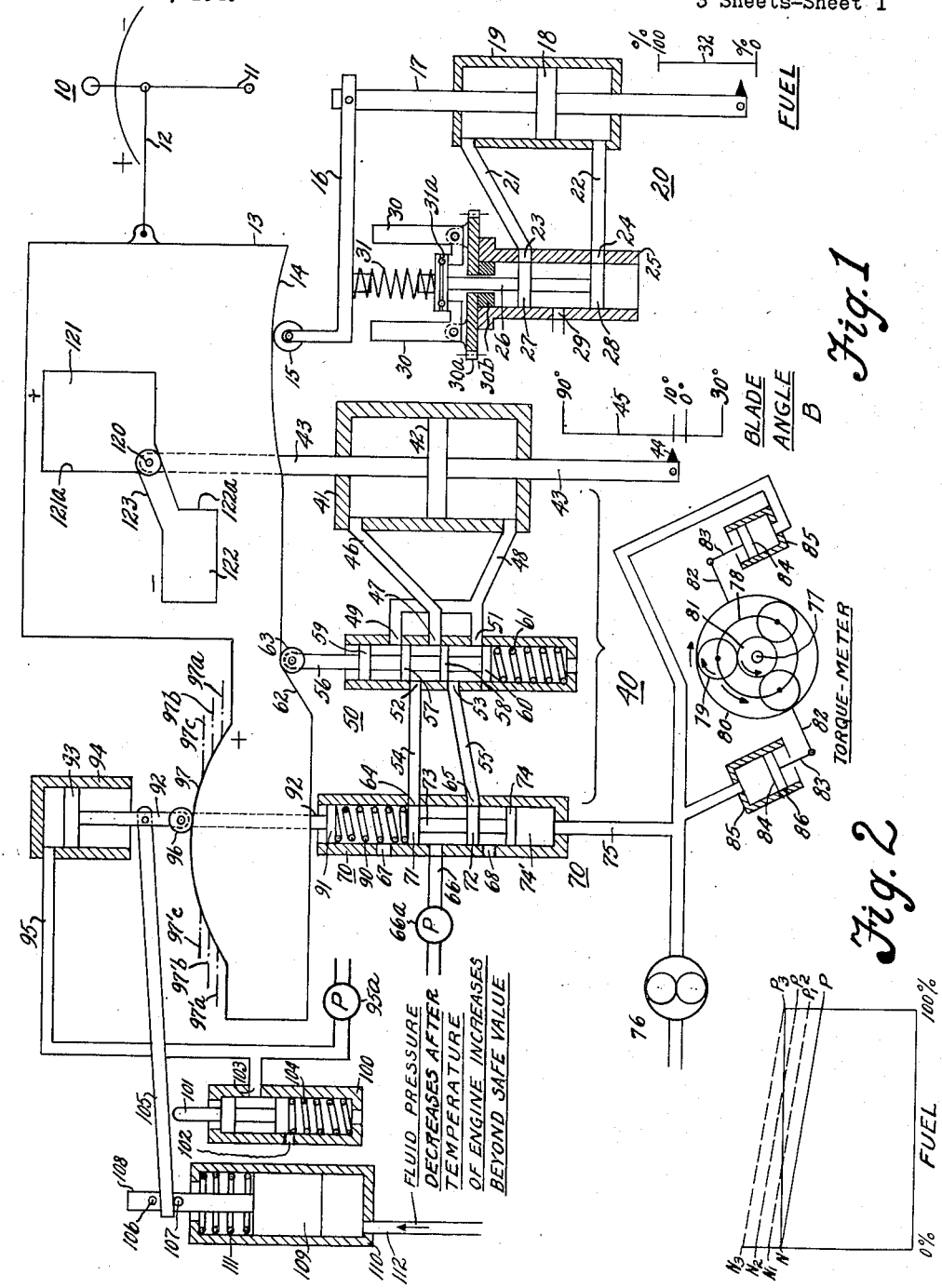

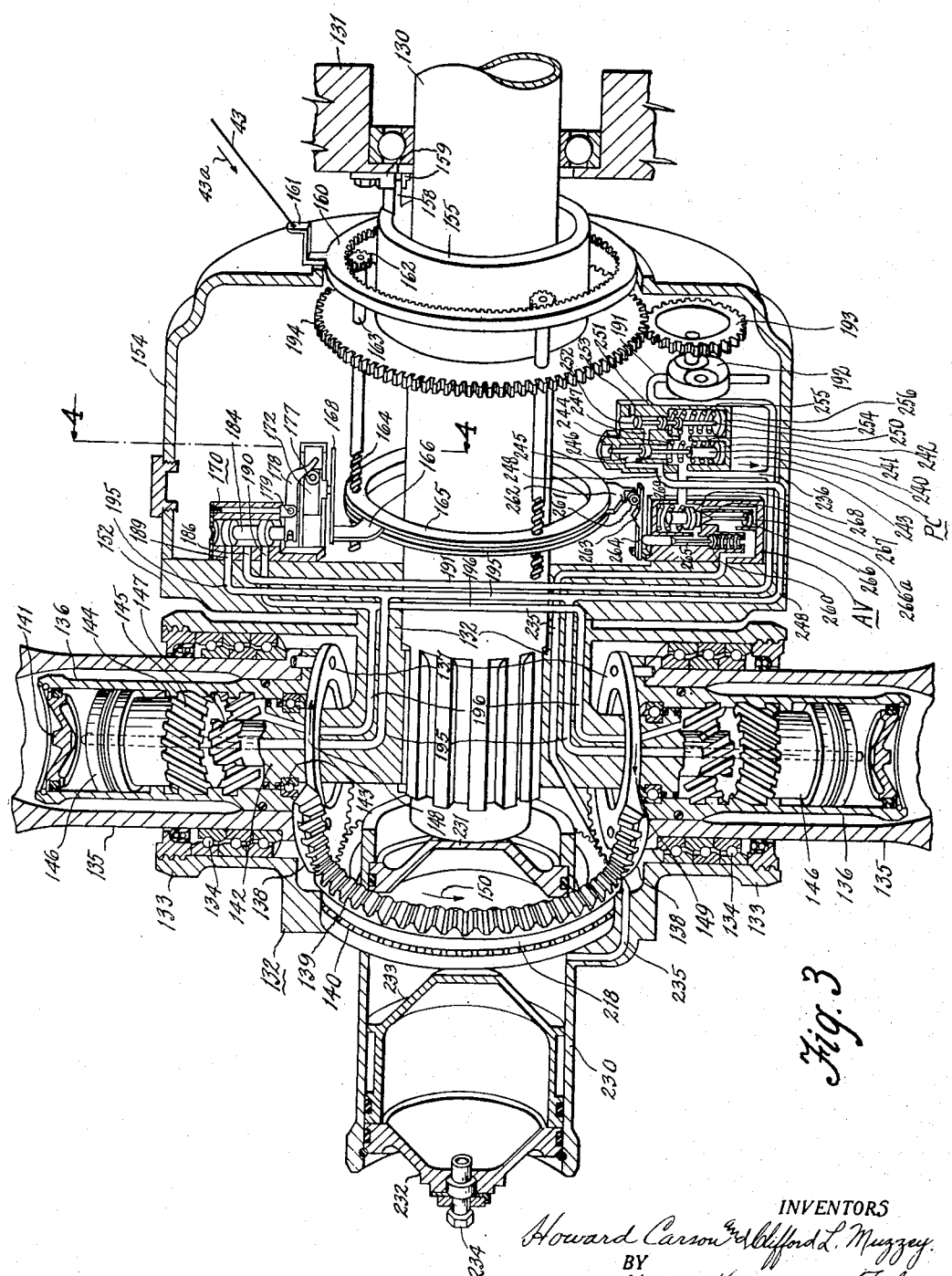

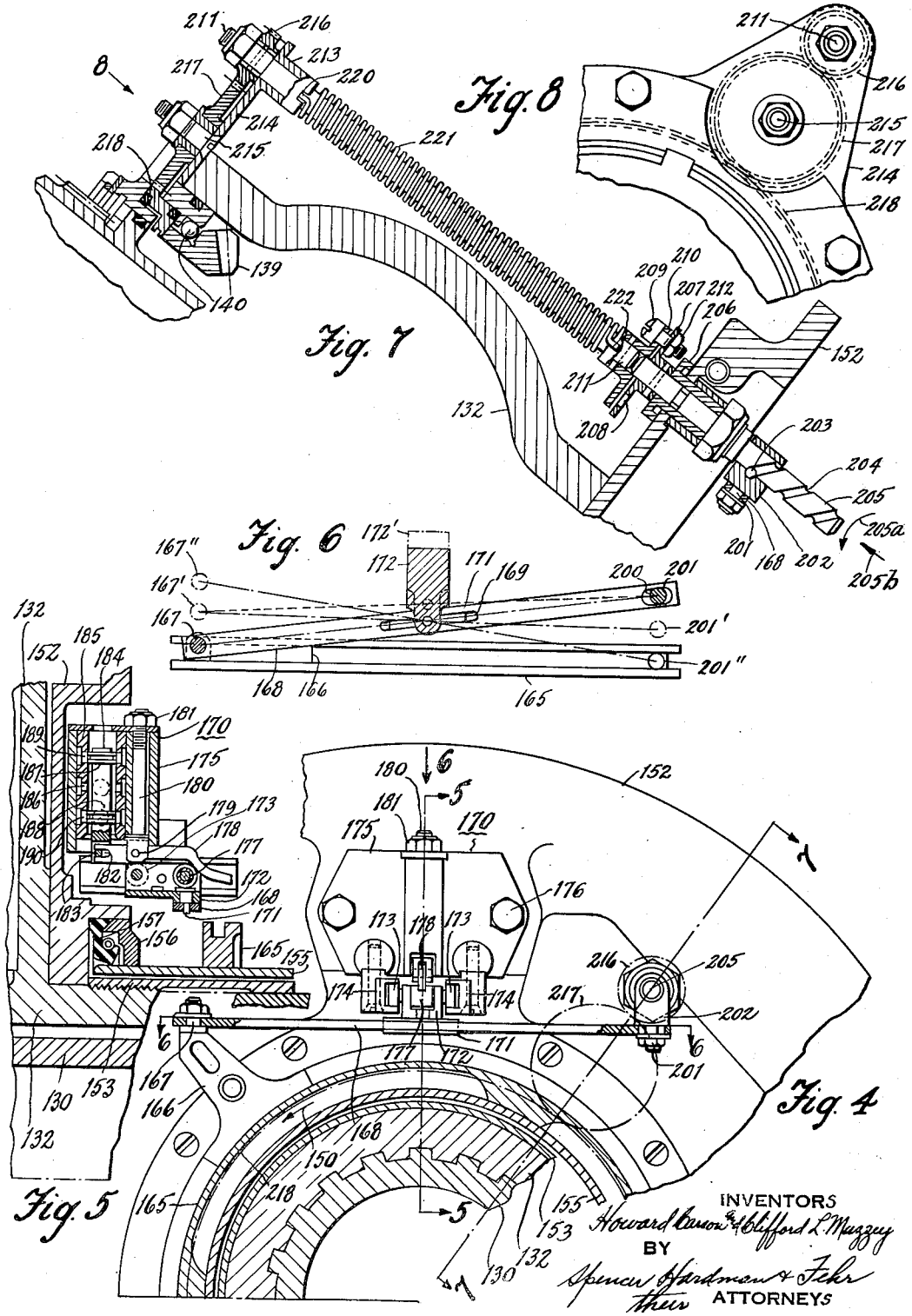

2,649,161

UNITED STATES PATENT OFFICE 2,649,161

ENGINE CONTROLLER

Howard Carson and Clifford L. Muzzey, Dayton, Ohio, assignors to General Motors Corporation, Detroit, Mich., a corporation of Delaware Application November 19, 1945, Serial No. 629,578

11 Claims. (Cl. 170—135.74)

This invention relates to apparatus for controlling an airplane power plant, for example, an internal combustion turbine engine driving a propeller.

An object of the invention is to provide manually controlled means for varying the load on the engine in combination with a fuel governor which automatically controls the fuel supply so that a predetermined engine speed will be maintained with varying load.

A further object is to provide engine temperature responsive means for modifying the manually effected control so as to reduce the load automatically to the extent necessary to prevent overheating the engine.

Another object is to provide for adjustment of propeller pitch either in the positive range or in the negative range, to provide direct manual control of blade angle during transition from the status of low torque in the positive range to the status of low power in the negative range, and to provide means for preventing shift of control from one range to the other while the air speed of the airplane is excessive.

Further objects and advantages of the present invention will be apparent from the following description, reference being had to the accompanying drawing, wherein a preferred embodiment of the present invention is clearly shown.

In the drawing:

Fig. 1 is a diagram of control apparatus embodying the present invention.

Fig. 2 is a chart showing the operation of the fuel governor.

Fig. 3 is a longitudinal sectional view in perspective, somewhat diagrammatic, of a propeller hub and blade angle control unit with which the controller, shown in Fig. 1, may be used.

Fig. 4 is a fragmentary sectional view on the line 4—4 of Fig. 3.

Fig. 5 is a fragmentary sectional view on line 5—5 of Fig. 4.

Fig. 6 is a fragmentary sectional view on line 6—6 of Fig. 4.

Fig. 7 is a fragmentary sectional view on line 7—7 of Fig. 4.

Fig. 8 is a fragmentary end view looking in the direction of arrow 8 in Fig. 7.

The main control lever 10 in the cockpit is pivoted at 11 and is connected by link 12 with a plate 13 providing control cams, one of which is designated by numeral 14. Cam 14 is engaged by roller 15 carried by lever 16 connected with a piston rod 17 of a piston 18 received by a cylinder 19 forming a part of the fuel control servo 20. Cylinder 19 is connected by passages 21 and 22 with ports 23 and 24 respectively of a valve guide 25 receiving a valve 26 having lands 27 and 28. Valve guide 25 provides an inlet port 29. Valve 26 is under control by governor weights 30 and a spring 31 confined between valve 26 and lever 16. The pressure of spring 31 is applied to valve 26 through a thrust bearing 31a. Piston rod 17 is connected with the fuel control apparatus not shown, but indicated by the scale 32. As power demand increases, the fuel rate is increased in order to maintain governed speed by upward movement of the servo piston 18. Weights 30 are pivotally supported by a gear 30a driven by the engine and having a hub 30b supported by valve guide 25.

Referring to Fig. 2, the base line represents power output in percentage and the vertical line represents speed. The standard speed for the turbine is represented by line N. As the piston rod 17 moves up to increase the fuel rate, the compression of spring 31 is relieved. Therefore the valve 26 is in equilibrium position at a speed which decreases as the fuel rate increases. This is represented by line N—P. The governor therefore has a droop characteristic which is conducive to stability. In order that the speed N will be maintained throughout the range of fuel adjustment, the cam 14 acts upon the roller 15 in a manner such that the spring 31 is deflected an amount equal to the amount that it is relieved by upward movement of the piston rod 17. Therefore the governor speed will remain at value N throughout the range of fuel adjustment. The effect of the cam 14 is to raise the droop line N—P to various positions such as $N_1$—$P_1$, $N_2$—$P_2$, $N_3$—$P_3$. Therefore while the governor has a droop characteristic, the cam 14 operates to raise the droop line so that the equilibrium position of valve 26 is always at speed N.

Numeral 40 designates generally the blade angle control servo. This comprises a cylinder 41 receiving a piston 42 connected with a rod 43 which operates, through connections not shown, a valve for controlling an hydraulic servo or torque unit which adjusts the blade pitch. The function of the rod 43 is indicated by the pointer 44 and the scale 45. It will be noted that the adjustment of blade angle β is between −30° and +90°.

Pipe 46 connects cylinder 41 with port 47 of a switch-over-valve designated generally by numeral 50. Pipe 48 connects cylinder 41 with ports 49 and 51. There are two other ports 52 and 53 connected respectively with pipes 54 and 55. These ports are controlled by lands 57 and 58 of a valve 56 having also guiding flanges 59 and 60, the latter of which is engaged by a spring 61 which urges a roller 63 (carried by valve 56) against plate 13. Valve 56 is in position for positive pitch control. When main control lever 10 is moved right into the negative pitch control range, a cam 62 effects downward movement of the roller 63 and valve 56 to cause it to move into position to reverse the connections between pipes 54 and 55 and pipes 46 and 48 so that the unit 40 will be in condition for negative pitch control.

Pipes 54 and 55 are connected respectively with ports 64 and 65 of a valve unit 70 having an inlet port 66 and drain ports 67 and 68. Inlet 66 is connected with an oil pressure source such as pump 66a and pressure control valve. Flow from inlet 66 through ports 64 and 65 is controlled by lands 71 and 72 of a valve 73 providing a piston 74 under the control of oil pressure entering through a pipe 75 connected with a pressure pump 76 and connected with an hydraulic torque meter associated with the reduction gears connecting the turbine with the propeller. The turbine shaft is indicated at 77 and the propeller shaft, which is not shown, is represented by a circle or ring 78. Ring 78 provides pivotal supports for planetary gears 79 meshing with a ring or internal gear 80 and a gear 81 connected with turbine shaft 77. Ring gear 80 provides arms 82 connected with piston rods 83 of pistons 84 received by cylinders 85 connected as shown with pump 76 and with pipe 75. One of the cylinders 85 is provided with a relief port 86. As this torque meter is shown, direction of rotation of the turbine shaft and propeller shaft is counterclockwise and the direction of torque on the ring gear 80 is clockwise. As engine torque increases, there is an increase of oil pressure in cylinders 85 and therefore in the cylinder 74' which receives the piston 74 of valve 73.

Oil pressure (varying with engine torque) acting upon piston 74 is opposed by the force of a spring 90 located between the land 71 and a pad 91 carried by rod 92 connected with a piston 93 received by a cylinder 94 connected by pipe 95 with a source of oil pressure such as a pump 95a. Oil pressure above piston 93 urges rod 92 downwardly so that a roller 96 carried thereby is urged into engagement with a cam 97 operated by lever 10. Movement of the lever 10 in either direction to increase the power for positive or negative pitch causes cam 97 so to be located that oil pressure will force the rod 92 down to increase the compression of spring 90, thereby effecting an increase of blade angle calling for increase in power output from the turbine to the propeller. As power output increases, there is an increase of pressure in cylinders 85 of the torque meter and the pressure in cylinder 74' of the valve unit 70. Valve 73 comes into equilibrium position when the torque or power output is equal to that demanded by the compression of spring 90 which is controlled by cam 97.

Cam 97 is controlling so long as the pressure above the piston 93 overcomes the pressure of spring 90. In order to protect the turbine blades against overheating, it is necessary to interpose means responsive to turbine exhaust temperature for lowering the oil pressure on piston 93 to a value less than the force of spring 90 so that this spring can be relieved to effect a reduction of engine power output by effecting, through the unit 40, a reduction in blade angle. In order to reduce pressure above piston 93, there is provided a relief valve 100 having a balanced valve 101 controlling a drain port 102 and a port 103 connected with pipe 95. A spring 104 is normally effective to urge valve 101 upwardly to block the port 102. To open the relief port 102, valve 101 is moved downwardly by a lever 105 connected with rod 92 and having a floating fulcrum provided by pins 106 and 107 carried by piston rod 108 of a piston 109 movable in a cylinder 110 normally balanced in a non-effective position by the oil pressure on the lower side and by a spring 111 on the upper side. The lower end of cylinder 110 is connected by pipe 112 with a source of oil pressure having a relief valve, not shown, controlled by a thermostat located in the exhaust pipe of the turbine. This thermostat is one which is quickly responsive to variations in exhaust gas temperature. On a cold day, when the air entering the turbine is relatively cool, the temperature of the turbine blades may not exceed a safe value even for the highest power output demanded by cam 97. Under these conditions the oil pressure on piston 109 will be such as to elevate the piston 109 to a position where the lever 105 will always be above the end of valve 101 for all positions of the rod 92 as determined by the cam 97. On a hot day, the turbine blade temperature will be higher, and may exceed a safe limit when the turbine is putting out a certain amount of power to the propeller. As the temperature of the exhaust gas increases above a certain value, the oil pressure in cylinder 110 decreases, thereby permitting the spring 111 to move piston 109 down into a position wherein the spring 111 balances the oil pressure. The pins 106 and 107 are moved into a new location such that when the cam 97 is moved in either direction from neutral or zero torque position, downward movement of the rod 92 will effect, through lever 105, a downward movement of valve 101 to connect pipe 95 with drain 102 so that the pressure above piston 93 will be decreased to a value such that the spring 90 is permitted to expand to move follower 96 away from cam 97 and allow valve 73 to move upwardly to connect port 66 with port 64 whereby downward movement of the piston 42 is effected to decrease the blade angle, thereby decreasing the power output of the engine in order to maintain the turbine blade temperature within safe limits. The effect of increase of exhaust gas temperature to certain high values amounts substantially to placing a ceiling on the amount of torque which can be demanded by the manual setting of cam 97.

Thus the control of blade angle is made responsive to demand for power output as determined by the position of cam 97. However, the control by cam 97 is removed for the sake of protecting the turbine blades against overheating. The torque pressure balancing spring 90 is controlled by means responsive to turbine exhaust temperature when that temperature exceeds a value safe for turbine operation. While that temperature is below the safe value, the cam 97 has control of spring 90. When exhaust gas temperature reaches the danger point, the compression of spring 90 is no longer controlled by cam 97, but by oil pressure above piston 93 which varies approximately in accordance with exhaust gas temperature when in a range near the danger point.

The blade servo piston rod 43 carries a roller 120 received by a rectangular opening 121 in plate 13 for positive pitch control or by a rectangular opening 122 for negative pitch control. The openings 121 and 122 are connected by a gate 123 which must receive the roller 120 during the transition from positive to negative governed pitch. The inclination of the gate 123 is such as to maintain a predetermined schedule of blade angle with respect to position of lever 10 during the shift between positive and negative pitch positions. This is necessary since, at low blade angle and power output, the ratio $$\frac{\partial Q}{\partial \beta}$$

is zero or nearly equal to zero, Q being torque due to blade angle change and $\beta$ being blade angle. The surface 121a of the opening 121 will be engaged by the roller 120 while positive blade angle is high. Therefore it is necessary that the air speed of the plane be low in order to reduce positive blade angle to a low value before the shift from positive to negative pitch can be made. In like manner the surface 122a of opening 122 makes it necessary that the air speed be low in order to reduce the negative blade angle to a low value before the shift can be made from negative to positive pitch control.

The manner in which blade angle is controlled by the piston rod 43 will now be described with reference to Figs. 3 to 8.

Fig. 3 shows, in perspective, a type of propeller hub equipped with blade angle control apparatus of the type shown in Blanchard and MacNeil patents, No. 2,307,101 and 2,307,102, issued January 5, 1943. The engine shaft 130 extends from the engine frame 131 and supports and drives a propeller hub 132 providing blade receiving sockets 133, each providing bearings 134 for supporting a blade for rotation about the axis of its root 135. Each blade root 135 is connected with a torque unit cylinder 136 also connected with a plate 137 providing a bevel gear segment 138 meshing with a master or equalizing bevel gear 139 supported by a bearing 140 carried by the hub 132. Each cylinder 136 is closed at its outer end by a cover or head 141 and at its inner end by a portion 142 of the hub 132 which provides a bearing 143 concentric with bearings 134. Cylinder 136 is provided with internal helical splines 144 mating with external helical splines 145 of a piston 146 having internal helical splines mating with external helical splines 147 provided by the hub portion 142. The construction is such that inward movement of the pistons 146 effects blade angle increase in the direction of arrows 148 and 149 while gear 147 rotates in the direction of arrow 150.

The hub 132 carries a plate 152 secured thereon by tubular nut 153 (Fig. 5). Plate 152 carries a cover 154, thus providing an oil reservoir and an enclosure for a pump 192, a pressure control valve PC, an accumulator control valve AV and a distributor valve 170. There extends into this enclosure a non-rotatable sleeve 155 which is supported concentric with the shaft 130 by sealed bearings provided by the plate 152 and the cover 154 as shown in detail in the Blanchard and MacNeil patents referred to. One of the bearings is shown at 156 in Fig. 5; and the seal for this bearing is marked 157. To prevent rotation of the sleeve 155, it is provided with a tang 158 received between two brackets 159 attached to the engine frame 131. The sleeve 155 supports a ring gear 160 having an arm 161 with which the piston rod 43 (Fig. 1) is connected in any suitable manner. Gear 160 drives pinions 162, each attached to a shaft 163 supported by the sleeve 155 and providing a screw 164 threadedly engaging a grooved control ring 165 receiving a shoe 166 which is caused to move parallel to the axis of the engine shaft 130 when the gear 160 is rotated by the piston rod 43.

Referring to Figs. 4, 5 and 6, the shoe 166 carries a pivot stud 167 which connects the shoe with a bar 168 having a slot 169 receiving a shoe 171 pivotally supported by a carriage 172 forming part of a distributor valve unit 170 supported by the plate 152. The carriage 172 carries on each side thereof a pair of trunnion wheels 173, each pair being received by the groove of a channel bracket 174 secured to the main frame 175 of the unit 170, which frame is attached by screws 176 to the plate 152. The carriage 172 carries a roller 177 for engaging a lever 178 pivotally supported at 179 by the head of a screw 180 fastened to the frame 175 by a nut 181. Lever 178 provides a notch 182 receiving a pin 183 attached to a valve 184 which slides in a valve guide 185 provided by frame 175. Guide 185 provides inlet ports 186 located between the lands 187 and 188 of valve 184 which control respectively ports 189 and 190. As shown diagrammatically in Fig. 3, inlet ports 186 are connected by pipe 191 with a pump 192 operated by a gear 193 meshing with a gear 194 non-rotatively supported by the sleeve 155. The ports 189 are connected by pipe 195 with the outer or pitch-increasing ends of the cylinders 136. The ports 190 are connected by pipe 196 with the inner or pitch-decreasing ends of the cylinders 136.

The right end (Fig. 6) of bar 168 provides a slot 200 which receives a stud 201 extending from a nut member 202 carrying a ball 203 received by helical groove 204 provided by a shaft 205 rotatable in a bearing 206 provided by the plate 152. Shaft 205 is connected with a plate 207 having an arcuate slot 208 through which there extends a screw 209 passing through a plain hole in a coupling plate 210 attached to a shaft 211. The plates 207 and 210 provide for angular adjustment between the shafts 205 and 211, this adjustment being maintained by the tightening of a nut 212 on the screw 209. Shaft 211 is supported in a bearing 213 provided by a plate 214 attached to the housing 132 and supporting a bearing 215 for an idle gear 217 which connects gear 216 attached to shaft 211 with gear 218 connected with master gear 139 (Fig. 7). One end 220 of a spring 221 is received by a notch in the bearing 213; and the other end 222 is received by a notch in the hub of plate 210 attached to the shaft 211 which spring 221 surrounds. The spring 221 is under tension such that back lash of the gear train 216, 217 and 218 is taken up.

The operation of the mechanism is as follows: If the movement of the piston rod 43 of Fig. 1 provides blade angle change from −30° to +90°, or 120° total, the mechanism shown in Figs. 4 to 8 provides for this amount of blade angle change. Assuming that the piston rod 43 is in the −30° position, the pivot stud 167 would be located as shown in Fig. 6; and the nut member 202 would be located as shown in Fig. 7, thereby locating the stud 201 in the position shown in Fig. 6. The carriage 172 will be located to the right of the position as shown in Figs. 3 and 5. Since the valve 184 is acted upon by centrifugal force, the lever 178 is maintained in contact with the roller 177 which when positioned as shown in Fig. 5, locates the lever 178 and valve 184 in neutral position as shown. When increase of blade angle in the positive sense is required, the piston rod 43 moves up in Fig. 1 or in the direction of arrow 43a of Fig. 3, to effect movement of the control ring 165 toward the left as in Figs. 3 and 5 or up in Fig. 6, thereby moving the pivot stud 167 to a position shown as 167' in Fig. 6. While stud 201 remains fixed carriage 172 moves to 172' in Fig. 6 or toward the left of its position shown in Fig. 5, thereby permitting upward movement of the valve 184 to connect ports 186 and 189, thereby admitting pressure fluid to the upper ends of cylinders 136 which causes blade angle to increase by turning of the blades in the directions of arrows 148 and 149 in Fig. 3. Such rotation of the blades about the root axes is accompanied by rotation of the gears 139 and 218 in the direction of arrow 150 in Figs. 3 and 4, thereby causing counterclockwise rotation of shaft 205 as indicated by arrow 205a when viewed in the direction of arrow 205b. This causes the nut 202 to travel downwardly in Fig. 7 and the stud 201 to move downwardly in Fig. 6 to a position shown at 201', thereby restoring the carriage 172 to the full line position shown in Fig. 6 or to the neutral position shown in Fig. 5. Therefore, when the demanded blade angle change has been effected, further change is arrested by restoration of the valve 184 to neutral position. Positions 167' of stud 167 and 201' of stud 201 correspond to a blade angle intermediate the extremes of the range from −30° to +90°. If full feathering or 90° blade angle has been required, the stud 167 would have been moved by the piston rod 43 to a position 167'', the carriage 172 would have moved to a position above the position indicated at 172'; and this would have effected a blade angle change resulting in a movement of the stud 201 to a position 201'', thereby restoring the carriage 172 to neutral position by the time +90° blade angle had been obtained.

In order to effect complete feathering of the blades and also to effect the unfeathering operation, a fluid pressure accumulator is provided. This accumulator comprises a cylinder 230 supported by the hub 132 and having and inner head 231 and an outer head 232 between which a piston 233 is located. The space between the piston 233 and the head 232 is filled with compressed gas through a check valve 234, thus driving the piston 233 toward the head 231. During normal operation, the space between the piston 233 and the head 231 receives oil pressure through a passage 235 which is connected with the pump 192 by an accumulator control valve AV and pipes 236 and 191, the pressure in said pipes being controlled by a pressure control unit PC which comprises a valve rod 240 having a dashpot head 241 received by a cylinder 242 connected with pipe 236 and urged outwardly by centrifugal force acting in the direction of arrow 243 and by a spring 244 in opposition to fluid pressure acting upon the lower (in Fig. 3) surface of a piston valve 245 received by a cylinder 246 and controlling a relief port 247. The inner end of cylinder 246 is connected by pipe 248 with pipe 195. Valve 245, being responsive to centrifugal force, causes the pressure in line 191 to increase as speed increases and this pressure is increased also when cylinder 246 receives pressure from the pipe 195 which is under pressure when there is a demand for pitch increase.

The unit PC includes also a minimum pressure control valve provided by a rod 250 having lands 251 and 252 for controlling the connection between port 247 and a discharge port 253. The rod 250 has a dashpot head 254 engaged by a spring 255 located in a cylinder 256 connected with cylinder 242. The force of spring 255 is opposed by the fluid pressure acting upon the under (in Fig. 3) side of valve land 251. The pressure available in pipe 191 will be limited to a minimum value by movement of rod 250 to a position for connecting the ports 247 and 253, valve 245 having opened port 247. Up to a certain rotative speed of the hub, the pressure is limited to a minimum value in order that the accumulator will be fully charged within a short time even while the engine is operating at low speed. This minimum pressure is sufficient for the pitch decreasing function of the torque units. As propeller speed increases, valve 245, being under control by centrifugal force, requires greater line pressure to cause the opening of the port 247. Therefore the pressure increases in pipe 191 above the minimum in order to make available the pressures required for the pitch increasing function which requires greater pressure with increase of speed.

While rod 250 of unit PC is shown parallel with rod 240 which is under the action of centrifugal force, it will be understood that rod 250 is not controlled by centrifugal force but is actually located at right angles to rod 240. The units PC and AV are detailedly described in the copending application of David A. Richardson, Serial No. 613,563, filed August 30, 1945.

For the understanding of the present invention, it is sufficient to state that the accumulator control valve unit AV has a check valve 260 which normally blocks flow from the accumulator 230 to pipe 235. When feathering is required, ring 165 is moved to the extreme left to cause a roller 261 (carried by a shoe 262 received in the groove of ring 165) to engage a cam 263 carried by a lever 264 and to effect outward movement of said lever and of a rod 265 thereby opening the check valve 260. Pressure oil then flows from the accumulator to underside (in Fig. 3) of a piston 266 thereby effecting the opening of a valve 267 so that the accumulator may discharge to pipe 236 through a by-pass around the check valve. During this discharge, the valve 267 is held open by oil pressure against the underside (in Fig. 3) of a piston 268. As feathering is completed, the pressure differential between the pressure in pipe 236 and the pressure against the underside of piston 268 decreases and spring 269 closes valve 267. Cam 263, having been momentarily contacted by roller 261 during movement of ring 165 to the extreme left, check valve 260 recloses. Therefore discharge of the accumulator is prevented until it is desired to use accumulator pressure to assist in the unfeathering operation. This is effected by right (in Fig. 3) movement of ring 165 which effects momentary opening of check valve 260; and the discharge of the accumulator into pipes 236 and 191 takes place.

While the embodiment of the present invention as herein disclosed, constitutes a preferred form, it is to be understood that other forms might be adopted, all coming within the scope of the claims which follow.

What is claimed is as follows:

1. Control apparatus for an engine-propeller combination, the propeller having blades rotatable about their longitudinal axes to vary the pitch position thereof comprising, manually controlled means for varying the load on the engine including a fluid pressure operated device for varying the pitch position of said blades, a manually operable member for modifying the operation of said device, and means controlled by the engine torque transmitted to said propeller and by said member including a source of fluid pressure and a valve for controlling flow from said source to said device, to control the pitch position of said blades; a speed responsive fuel governor for controlling the supply of fuel to the engine to maintain a desired speed; and means including an abutment operable by said manual means and responsive to engine temperature for modifying the effect of said member upon the control means for said pitch varying device independently of the setting of said member in order to reduce the pitch position of said blades so that overheating of the engine will be prevented.

2. Control apparatus for an engine-propeller combination, the propeller having blades rotatable about their longitudinal axes to vary the pitch position thereof comprising, a device for varying the pitch position of said blades including a spring, means responsive to changes in engine torque transmitted to the propeller, an element for controlling the pitch varying device, said element being controlled by the spring and the torque responsive means, and manually controlled means for varying the force of said spring; a speed responsive fuel governor including a fluid motor and a control valve for controlling the supply of fuel to the engine to maintain a desired speed; and means responsive to engine temperature including a fluid motor and a relief valve opened on temperature rise for modifying the manually effected control of the force of said spring in order to prevent overheating of the engine by effecting a reduction in the blade pitch position.

3. Engine control apparatus having an engine-propeller combination subject to combined fuel rate and blade pitch changes for efficient power development, comprising in combination, a fuel control servo for altering the rate of fuel delivery to the engine including a speed responsive device for effecting change of fuel rate delivery, resilient means opposing the speed responsive means and a floating lever operable by said fuel control for flexing variably the resilient means and for effecting a droop characteristic in the response of said fuel control servo, a fluid servo for changing the blade pitch within a selected range of adjustment, means for selecting a positive or negative range of pitch adjustment for the propeller blades, and means operable coincident with selection of a different range of pitch for the blades to also shift the droop characteristic of said fuel control servo.

4. Engine control apparatus having an engine-propeller combination subject to combined fuel rate and blade pitch changes for efficient power development, comprising in combination, a fuel control servo including a governor valve with a variably stressed spring and lever support and a feed-back to the lever from said fuel control servo providing droop characteristics for increasing the fuel rate as the power demand increases to maintain governed speed, said valve reaching equilibrium at a speed which decreases as the fuel rate increases, a blade angle servo including a pressure actuated piston and a control valve for matching the blade pitch to the power development of the engine, means responsive to a change in torque of the engine for shifting the blade pitch in an increasing direction to satisfy the power available, means responsive to temperature of engine operation for opposing the shift of blade pitch by the torque responsive means, and manual means including a cam actuating said lever support for coincidentally shifting the droop characteristics of the fuel control servo, the range of blade angle change and the opposition to the engine torque effected blade change.

5. Engine control apparatus having an engine-propeller combination subject to combined fuel rate and blade pitch changes for efficient power development, comprising in combination, a fuel control servo for altering the rate of fuel delivery to the engine including a speed responsive valve reaching equilibrium at a speed which decreases as the fuel rate increases, and a blade angle servo operable to shift the blade pitch to absorb the power output of the engine in all equilibrium positions of the speed responsive valve, said blade angle servo including a fluid pressure piston and cylinder adapted to effect shift of the propeller blades, a source of fluid pressure for the piston and cylinder, a control valve for applying the fluid pressure to the said cylinder, a switch-over valve for selecting the positive or negative range within which said piston and cylinder will effect shift of the blade pitch, means responding to the torque of the engine transmitted to the propeller for actuating the control valve, a resilient abutment opposing movement of said control valve in responding to the influence of said engine torque, and means for altering the opposition offered by the resilient abutment to limit increasing blade angle shift to a safe value for the power output of the engine.

6. The combination set forth in claim 5 wherein the means for altering the resilient opposition includes a cam surface and follower with means for actuating the follower in response to engine temperature change.

7. The combination set forth in claim 5 wherein the means for altering the resilient opposition includes a cam surface and follower with means for actuating the follower in response to engine temperature change, manual means for shifting the cam surface to permit increase of control valve opposition for increasing blade angle change in either the positive or negative pitch range, and means associated with said manual means for selecting the range within which said blades shall operate and for limiting the extent of said positive and negative range.

8. The combination set forth in claim 5 wherein the means for altering the resilient opposition includes a cam surface and follower with means for actuating the follower in response to engine temperature change, manual means for shifting the cam surface to permit increase of control valve opposition for increasing blade angle change in either the positive or negative pitch range, and means associated with said manual means for selecting the range within which said blades shall operate and for limiting the extent of said positive and negative range, and means actuated by said manual means for increasing the speed level at which the speed responsive means reaches equilibrium as the rate of fuel feed is increased.

9. The combination set forth in claim 5 wherein the means for altering the opposition to control valve movement includes a manually actuated cam, a cam follower engageable with the cam surface, a fluid piston and chamber operable to move the follower against the cam, a source of fluid pressure for the chamber and temperature responsive means operable upon engine temperature rise to reduce the pressure in said chamber and thereby reduce the opposition to movement of the control valve by the engine torque conditions.

10. In an engine-propeller combination, a blade angle servo mechanism for shifting the blade angle in accordance with power demands for the engine to run at constant speed, said servo mechanism including a piston and cylinder, for controlling the pitch position of the blade, a source of fluid pressure and a valve for controlling the application of pressure fluid to said cylinder, said valve having an equilibrium position where there is no pressure application to the piston and cylinder, means responsive to engine torque applied to the propeller for effecting movement of the valve in one direction away from the equilibrium position, resilient means opposing movement of said valve by said torque responsive means away from the equilibrium position and capable of effecting valve movement in the opposite direction, manually operated means for establishing a maximum of opposition to movement of said valve by said torque responsive means away from the equilibrium position for any blade pitch position, fluid pressure means tending to maintain the maximum opposition established by the manual means, and means responding to the temperature of said engine for modifying the pressure maintaining the maximum opposition so that the control valve can be moved from the equilibrium position on temperature increase of the engine.

11. Control apparatus for an engine-propeller combination, the propeller having blades rotatable about their longitudinal axes to vary the pitch position thereof, comprising, a speed responsive fuel governor for controlling the supply of fluid to the engine to maintain a selected speed, a source of fluid pressure, a fluid pressure operated device for varying the pitch position of said propeller blades, valve means operatively connected with said source and said device and operable to control said pitch varying device so as to increase, reduce, or maintain the pitch position of said blades, means responsive to the torque of said propeller, first fluid motor means operatively associated with said valve means and controlled by said torque responsive means for controlling the operation of said valve means, resilient means associated with said valve means and exerting a force in opposition to said first motor means, manually operable means for modifying the force exerted by said resilient means, and means responsive to engine temperature including second fluid motor means operatively associated with said resilient means for modifying the force exerted by the resilient means.

HOWARD CARSON.
CLIFFORD L. MUZZEY.

References Cited in the file of this patent
UNITED STATES PATENTS

| Number | Name | Date |
|---|---|---|
| 1,629,319 | Standerwick | May 17, 1927 |
| 2,216,416 | Mader | Oct. 1, 1940 |
| 2,217,364 | Halford et al. | Oct. 8, 1940 |
| 2,231,292 | Neugebauer | Feb. 11, 1941 |
| 2,300,419 | Hammond et al. | Nov. 3, 1942 |
| 2,303,998 | Holley | Dec. 1, 1942 |
| 2,320,195 | Rindfleisch | May 25, 1943 |
| 2,322,303 | Martin | June 22, 1943 |
| 2,346,916 | Halford et al. | Apr. 18, 1944 |
| 2,352,786 | Hammond et al. | July 4, 1944 |
| 2,391,323 | Martin | Dec. 18, 1945 |
| 2,401,497 | Mercier | June 4, 1946 |
| 2,402,885 | Gilfillan et al. | June 25, 1946 |
| 2,457,595 | Orr | Dec. 28, 1948 |